United States Patent
Sylvain (10) Patent No.: US 7,480,283 B1
(45) Date of Patent: Jan. 20, 2009

(54) VIRTUAL TRUNKING OVER PACKET NETWORKS

(75) Inventor: Dany D. Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 1232 days.

(21) Appl. No.: 10/175,122

(22) Filed: Jun. 19, 2002

Related U.S. Application Data (60) Provisional application No. 60/367,676, filed on Mar. 26, 2002.

(51) Int. Cl.
*H04L 12/66* (2006.01)
*H04M 7/00* (2006.01)

(52) U.S. Cl. .................................. 370/352; 379/220.01

(58) Field of Classification Search ........................ None
See application file for complete search history.

(56) References Cited

U.S. PATENT DOCUMENTS

| | | | | |
|---|---|---|---|---|
| 5,583,860 | A * | 12/1996 | Iwakawa et al. | 370/232 |
| 6,226,289 | B1 * | 5/2001 | Williams et al. | 370/385 |
| 6,336,129 | B1 * | 1/2002 | Ise et al. | 709/201 |
| 6,356,622 | B1 | 3/2002 | Hassell et al. | |
| 6,515,985 | B2 | 2/2003 | Shmulevich et al. | |
| 6,519,257 | B1 | 2/2003 | Brueckheimer et al. | |
| 6,522,627 | B1 * | 2/2003 | Mauger | 370/230 |
| 6,529,499 | B1 * | 3/2003 | Doshi et al. | 370/352 |
| 6,678,264 | B1 | 1/2004 | Gibson | |
| 6,683,877 | B1 * | 1/2004 | Gibbs et al. | 370/395.2 |
| 6,744,768 | B2 | 6/2004 | Vikberg et al. | |
| 6,765,921 | B1 * | 7/2004 | Stacey et al. | 370/401 |
| 6,775,269 | B1 | 8/2004 | Kaczmarczyk et al. | |
| 6,842,513 | B1 * | 1/2005 | Androski et al. | 379/220.01 |
| 6,882,643 | B1 * | 4/2005 | Mauger et al. | 370/389 |
| 6,931,110 | B2 | 8/2005 | Bates et al. | |
| 6,973,072 | B1 * | 12/2005 | Muntz | 370/351 |
| 6,987,727 | B2 | 1/2006 | Fredette et al. | |
| 7,046,669 | B1 | 5/2006 | Mauger et al. | |
| 7,082,102 | B1 | 7/2006 | Wright | |
| 7,088,681 | B2 | 8/2006 | Ladegaard | |

(Continued)

FOREIGN PATENT DOCUMENTS

EP      0 961 519 A2    12/1999

OTHER PUBLICATIONS

International Search Report for PCT/IB03/00861 mailed Jul. 16, 2003.

*Primary Examiner*—Firmin Backer
*Assistant Examiner*—Clemence Han
(74) *Attorney, Agent, or Firm*—Withrow & Terranova, P.L.L.C.

(57) ABSTRACT

The present invention establishes reserved paths between nodes in a packet network. Each reserved path has a defined bandwidth and may be implemented as a label switched path (LSP) in a multiprotocol label switched (MPLS) network or a permanent virtual circuit (PVC) in an asynchronous time multiplexing (ATM) network. Associated with each reserved path is a virtual trunk group having the same bandwidth as that of the virtual path. Telephony calls requiring media flows associated with a channel in the virtual trunk group will transport packets along the reserved path associated with the virtual trunk group. Access to the reserved path may be limited to only media flows associated with a virtual trunk group to ensure adequate bandwidth at all times for the number of channels associated with the virtual trunk group.

29 Claims, 6 Drawing Sheets

U.S. PATENT DOCUMENTS

| | | | |
|---|---|---|---|
| 7,142,532 B2 * | 11/2006 | Penfield et al. | 370/352 |
| 7,190,698 B2 | 3/2007 | Svanberg et al. | |
| 7,283,533 B1 * | 10/2007 | Kumar et al. | 370/395.52 |
| 7,286,467 B1 * | 10/2007 | Sylvain | 370/216 |
| 2001/0024438 A1 | 9/2001 | Sugiyama et al. | 370/352 |
| 2001/0053149 A1 | 12/2001 | Mo et al. | 370/389 |
| 2002/0060985 A1 * | 5/2002 | Lee et al. | 370/216 |
| 2002/0103924 A1 | 8/2002 | Nomura | |
| 2002/0167899 A1 * | 11/2002 | Thompson et al. | 370/222 |
| 2003/0012137 A1 | 1/2003 | Abdelilah et al. | |
| 2003/0043782 A1 | 3/2003 | Laursen et al. | |
| 2003/0095500 A1 | 5/2003 | Cao | |
| 2003/0110287 A1 * | 6/2003 | Mattson | 709/238 |
| 2003/0112749 A1 * | 6/2003 | Hassink et al. | 370/225 |
| 2003/0115480 A1 | 6/2003 | McDysan | |
| 2003/0123388 A1 * | 7/2003 | Bradd | 370/230 |
| 2003/0126287 A1 * | 7/2003 | Charny et al. | 709/239 |
| 2003/0219103 A1 | 11/2003 | Rao et al. | |
| 2004/0004941 A1 | 1/2004 | Malan et al. | |
| 2004/0064688 A1 | 4/2004 | Jacobs | |

* cited by examiner

VIRTUAL TRUNKING OVER PACKET NETWORKS

This application claims the benefit of provisional patent application Ser. No. 60/367,676, filed Mar. 26, 2002, the disclosure of which is hereby incorporated by reference in its entirety.

FIELD OF THE INVENTION

The present invention relates to telecommunications, and in particular to ensuring quality of service levels over packet networks.

BACKGROUND OF THE INVENTION

There is a growing interest in the convergence of the public switched telephone network (PSTN), the Internet and other internets and intranets. The convergence of these networks requires technology that facilitates interworking in a uniform and effective manner. The next generation of unified networks will provide an open and scalable architecture to accommodate multiple vendors and protocols under a common packet network. At the moment, there are several obstacles to providing telephony services on a packet network with the same level of performance and availability as is available on the PSTN today.

The traditional PSTN provides constant bandwidth streams of information between users. These media streams travel over dedicated circuits. On the other hand, packet networks have been prone to packet loss and delays, which affect the quality of streaming media required to carry voice communications. Given the high quality levels associated with the PSTN, subscribers expect and demand traditional quality regardless of the transmission medium.

The bursty nature of packet communications makes controlling communication quality and ensuring sufficient bandwidth very difficult. Traditional "fat pipe" models, which rely on the overall network to find a way to transmit the packets with the required quality of service levels, have not been successful. Further, the integration of call processing for the PSTN and packet networks has proven difficult to manage.

Given the desire to use packet networks as the centerpiece for telephony communications, there is a need for a way to ensure quality of service levels for telephony communication carried at least in part over packet networks and provide call processing in a uniform manner.

SUMMARY OF THE INVENTION

The present invention establishes reserved paths between nodes in a packet network. Each reserved path has a defined bandwidth and may be implemented as a label switched path (LSP) in a multiprotocol label switched (MPLS) network or a permanent virtual circuit (PVC) in an asynchronous time multiplexing (ATM) network. Associated with each reserved path is a virtual trunk group having the same bandwidth as that of the virtual path. Telephony calls requiring media flows associated with a channel in the virtual trunk group will transport packets along the reserved path associated with the virtual trunk group. Access to the reserved path may be limited to only telephony media flows associated with a virtual trunk group to ensure adequate bandwidth at all times for the number of channels associated with the virtual trunk group. Backup reserved paths may be associated with the primary reserved path to provide the necessary redundancy required for voice-based telephony applications.

Preferably, the node will include multiple media gateways, a media gateway controller, and an edge router providing a point of ingress and egress for the reserved path. The media gateways provide a traditional telephony interface to circuit-switched devices. The media gateway controller facilitates call control for calls emanating from the telephony devices and carried over the reserved path.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention establishes reserved paths between nodes in a packet network. Each reserved path has a defined bandwidth. Associated with each reserved path is a virtual trunk group. The virtual trunk group has the same bandwidth as the reserved path and supports a set number of channels. Telephony calls requiring media flows associated with a channel in the virtual trunk group will transport packets along the reserved path associated with the virtual trunk group. Access to the reserved path may be limited to only media flows associated with a virtual trunk group to ensure adequate bandwidth at all times for the number of channels associated with the virtual trunk group. Backup reserved paths may be associated with the primary reserved path to provide the necessary redundancy required for voice-based telephony applications. The following illustrates numerous ways to implement the concepts of the present invention.

Figure 1:
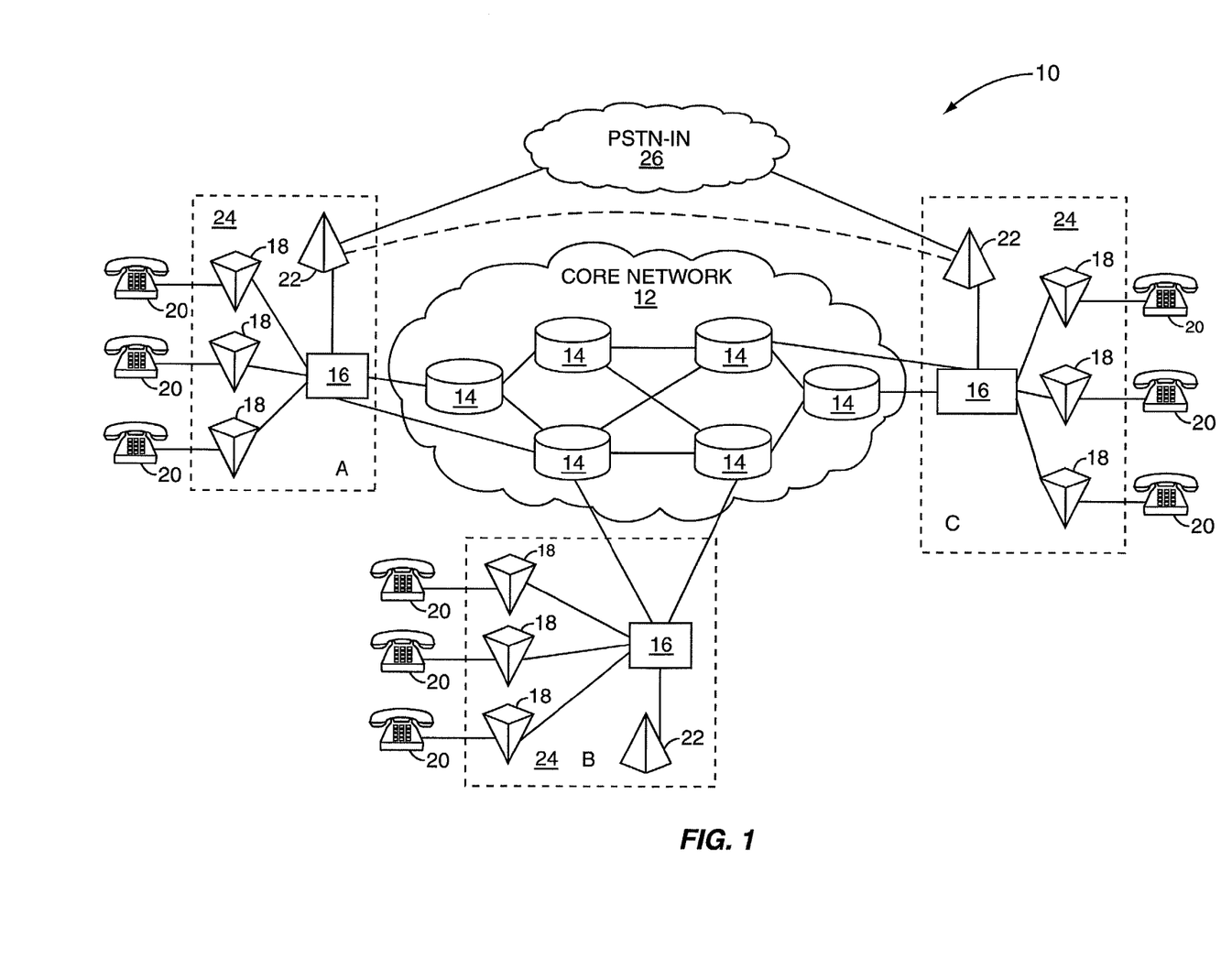
FIG. 1 is a block representation of a communication network infrastructure according to one embodiment of the present invention.

With reference to FIG. 1, a communication environment 10 is centered about a core packet network 12 having numerous routers 14 interconnected to facilitate the routing of packets between edge routers 16. The edge routers 16 act as the ingress and egress points for associated media gateways 18 to the core network 12. The media gateways 18 provide a packet interface for circuit-switched telephony devices, such as telephones 20. Media gateway controllers 22 are associated with and effectively control groups of media gateways 18. As illustrated, an edge router 16 may be associated with a group of media gateways 18 and a media gateway controller 22 to form a node 24. There are three nodes 24 illustrated in FIG. 1, referenced as A, B, and C. The media gateway controllers 22 may communicate with each other to facilitate call control between media gateways 18 in different nodes 24, or may cooperate with the call control entities of an intelligent network (IN) of the public switched telephone network (PSTN) 26.

To facilitate interworking of circuit-switched and packet communications, there are two primary elements: a media gateway 18 and a media gateway controller 22. The media gateway 18 provides the actual interface between the packet network associated with an edge router 16 and the telephony devices, such as telephones 20 or circuit-switched telephony interfaces such as TDM trunks (not shown). The media gateway controller 22 provides decision-making and coordination between media gateways 18 to facilitate interworking, alone or in association with other media gateway controllers 22 or the call control services of the PSTN 26.

The primary responsibility of a media gateway 18 is to allow traditional telephony media, such as voice, to be transported in a packet network using an Internet Protocol (IP) format asynchronous transfer mode (ATM) format. The media gateways 18 allow media to move without loss of integrity or quality between networks and network technologies. In essence, the media gateways 18 provide a bi-directional interface between disparate networks, and typically, between a traditional, circuit-switched, telephony network and a packet network.

For the purpose of describing the preferred embodiments of the present invention, the following description assumes the media gateways 18 provide a bi-directional interface between a circuit-switched network, such as the TDM-based PSTN devices or networks, and packet networks coupled to the edge routers 16. For example, the media gateway 18 may implement high-speed TDM trunk interfaces or line interfaces, which are commonly used interfaces between switching elements in a circuit-switched network.

The primary responsibilities of the media gateway controller 22 are to make decisions based on flow-related information and to provide instructions on interconnecting elements or endpoints within and throughout the networks. Media gateway controllers 22 store status information on media flows and may be used to generate administrative records for a variety of media-related activities, such as billing. Most prominently, media gateway controllers 22 provide coordination of media gateways 18. Typically, media gateway controllers 22 direct media gateways 18 to set up, handle, and end individual media flows, which will take place between the respective media gateways 18.

Figure 2:
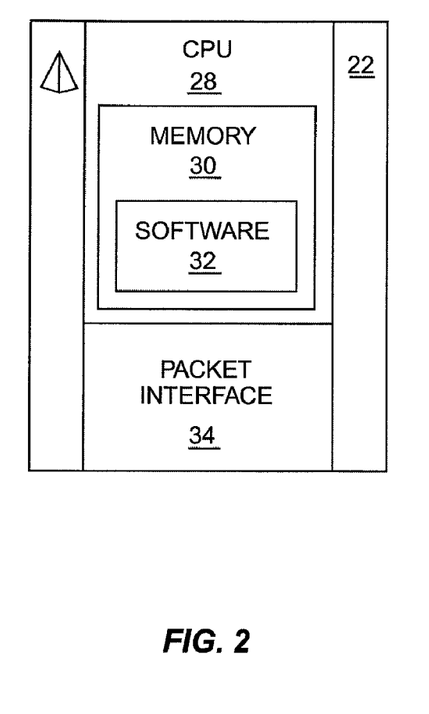
FIG. 2 is a block representation of a media gateway controller according to one embodiment of the present invention.

Referring now to FIG. 2, a block schematic of a media gateway controller 22 is shown having a central processing unit (CPU) 28 containing memory 30 and the requisite software 32 for operation. The media gateway controller 22 will have at least one interface, preferably a packet interface 34 capable of communicating with other media gateway controllers 22 and the associated media gateways 18. To establish such communications, the media gateway controllers 22 associated with the media gateways 18 supporting the telephones 20 cooperate with one another and the media gateways 18 to establish the communication sessions.

Figure 3:
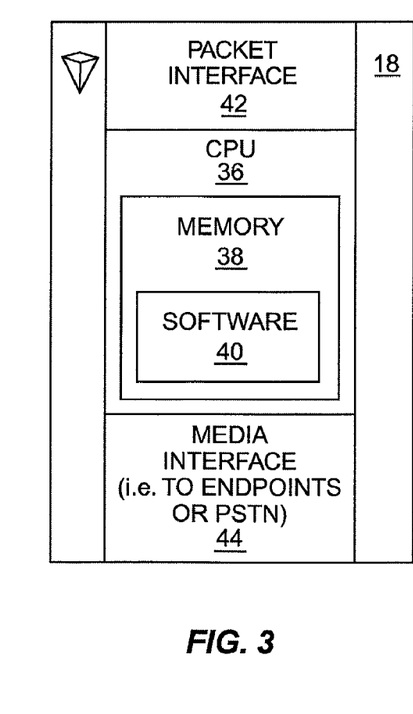
FIG. 3 is a block representation of a gateway according to one embodiment of the present invention.

Turning now to FIG. 3, a block schematic of a media gateway 18 is shown having a CPU 36 containing memory 38 and the requisite software 40 for operation. The CPU 36 operates to provide a bi-directional interface between one or more packet interfaces 42 and the media interface 44. The media interface 44 is the interface opposite the packet network, and is preferably a circuit-switched interface supporting traditional trunks and lines of a traditional, circuit-switched telephone network. When interfacing with traditional telephony equipment, the media interface 44 is typically configured to handle TDM communications or any other analog or digital data streams required to facilitate such communications. As illustrated in FIG. 1, the media interface 44 may be a line interface supporting a telephone 20.

Figure 4:
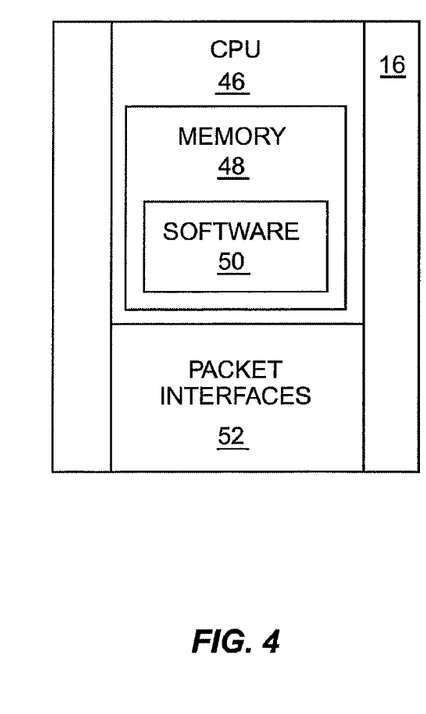
FIG. 4 is a block representation of an edge router according to one embodiment of the present invention.

FIG. 4 is a block schematic of an edge router 16 having a CPU 46 with associated memory 48 and the requisite software 50 for operation. The edge router 16 will have packet interfaces 52 capable of communicating with the associated media gateways 18 and media gateway controller 22 as well as the routers 14 in the core network 12 as will be described below in greater detail.

Figure 5:
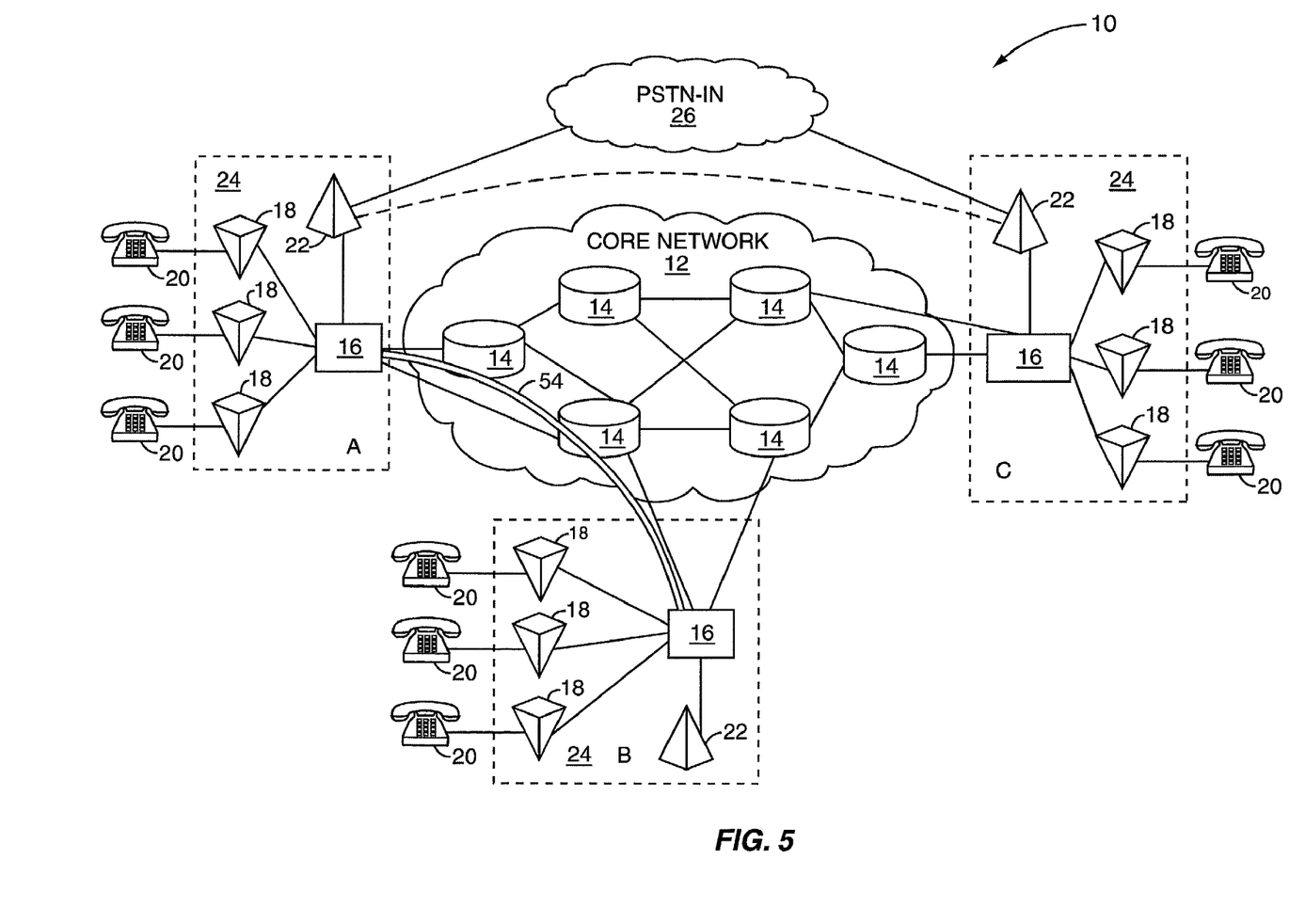
FIG. 5 illustrates a label switched path according to one embodiment of the present invention.

With reference to FIG. 5, assume the routers 14 in the core network 12 and the edge routers 16 cooperate to provide a multi-protocol label switching (MPLS) architecture. In an MPLS architecture, labels are appended to data packets being transferred from one edge router 16 to another via routers 14 in the core network 12. The labels define a particular label-switched path (LSP) 54 over which the data packet should travel from one edge router 16 to another. In this embodiment, assume the edge routers 16 are label edge routers (LERs), and that the routers 14 in the core network 12 are label switch routers (LSRs). When packets enter an MPLS architecture, the LERs look at the destination for the packet and any other packet attributes and assign the packet a label. The LERs then assign the data packet to a corresponding LSP 54, and it is sent to a first LSR in the assigned LSP 54. Each LSR along the LSP 54 will forward the data packet along the LSP 54 based on the label, until the packet reaches a destination LER, which will remove the label and route the packet to an appropriate media gateway 18.

As the packets travel along the LSP 54, the LSRs may simply monitor the label and forward the packet and label untouched, or may replace the label with a new label to facilitate routing or switching along the LSP 54. Each LSR 14 will include routing tables based on the labels. Thus, LSPs 54 extend between LERs, which are identified by labels. The LERs assign, add, and remove labels as traffic enters or exits the MPLS architecture. The MPLS architecture allows the establishment of LSPs 54 having a defined bandwidth reserved for the specified traffic source. Those skilled in the art will be familiar with the concepts of establishing LSPs 54 in an MPLS architecture. In the preferred embodiment, the LSPs 54 are provisioned by an operation system or network provisioning tool based on constraints provided by the network operator.

Figure 6:
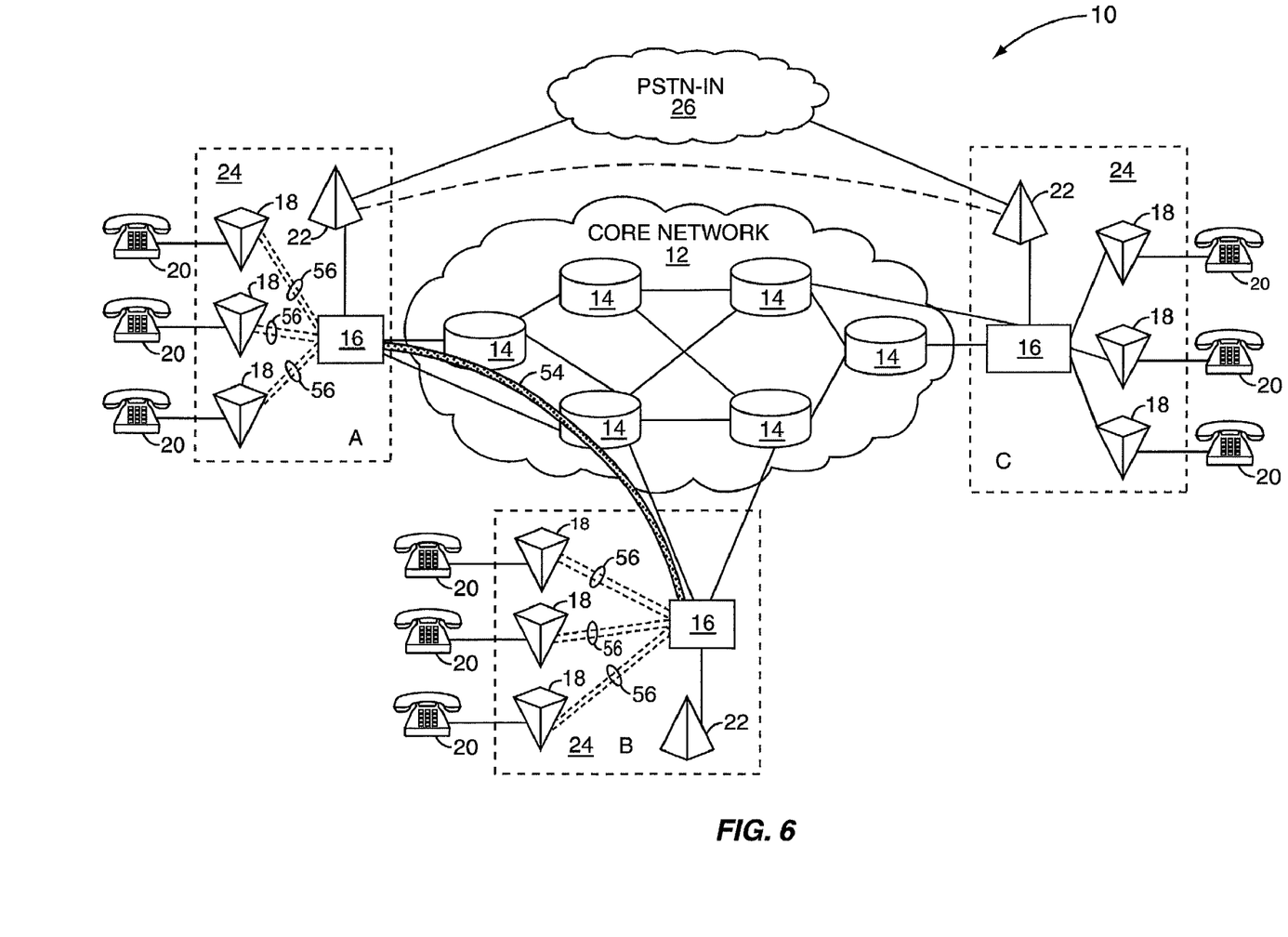
FIG. 6 illustrates a dynamic packet trunk group assigned to the label switch path of FIG. 5 according to one embodiment of the present invention.

In one embodiment of the present invention, at least one LSP 54 is established between a first LER (edge router 16 in node A (24)) and a second LER (edge router 16 in node B (24)) as illustrated in FIG. 5. The LSP 54 has a defined bandwidth and provides controlled access. A virtual, packet-based trunk group is mapped to correspond to the LSP 54. As such, the LSP 54 is engineered and provisioned with a guaranteed bandwidth matching the virtual trunk group size. With reference to FIG. 6, the thick shaded line overlaying the LSP 54 represents the virtual trunk group extending between the LERs provided by the edge routers 16. Individual media flows 56 are setup dynamically by the media gateway controller 22 between the gateways 18 and the LERs provided by the edge routers 16. Each individual media flow 56 represents a bi-directional communication. The media gateways 18 will provide an interface between a traditional telephony interface associated with a telephone 20 or like device and an individual media flow 56.

The packets associated with individual media flows 56 are sent back and forth between the gateway 18 and the LER provided by the edge router 16. Accordingly, the individual media flows 56 feed into a virtual trunk group supported by an LSP 54 at the LER provided by the edge router 16. For example, individual real-time protocol (RTP) voice over IP streams generated at the media gateway 18 are sent to the LER and form a media flow 56. The LER will assign a label to the packets forming the media flow 56, and based on the label, route the packet to an LSR provided by a router 14 associated with the LSP 54. In converse, packets coming in over a virtual trunk group from an LSP 54 into the LER will have their labels removed, and will be routed over an individual media flow 56 to the appropriate media gateway 18, which will convert the packets into TDM streams, or the like, to facilitate telephony communications. Thus, the individual media flows 56 provide a virtual trunk for bi-directional communication, virtual trunk and provide a virtual trunk group between routers 14 and through the core network 12.

The individual media flows 56 on either side of the LSP 54 for a call are set up under the control of the media gateway controllers 22 using an appropriate call processing or media session control protocol, such as the session initiation protocol for telephones (SIP-T) or Bearer Independent Call Control (BICC), which are familiar to those skilled in the art. Thus, the media gateway controllers 22 will cooperate with each other or with call processing entities in the PSTN 26 to facilitate a call between telephones 20 in different nodes 24. Standard telephony interfaces are used between the telephones 20 and the gateways 18, wherein a packet-based media session is established between the respective gateways 18.

Since the LSP 54 has a defined bandwidth and the virtual trunk group is designed to correspond to the LSP 54, the LSP 54 cannot use more bandwidth than originally allocated. For example, if the virtual trunk group is set for 2000 channels, and all channels are used, the bandwidth on the LSP 54, the $2001^{st}$ call will be blocked by the call processing of the media gateway controllers 22. This prevents the LSP 54 from using more bandwidth than originally allocated to avoid violating bandwidth contracts or suffering from degraded quality of service due to overloading. Thus, once a virtual trunk group is fully used, the call processing provided by the media gateway controller 22 will block further calls.

Figure 7:
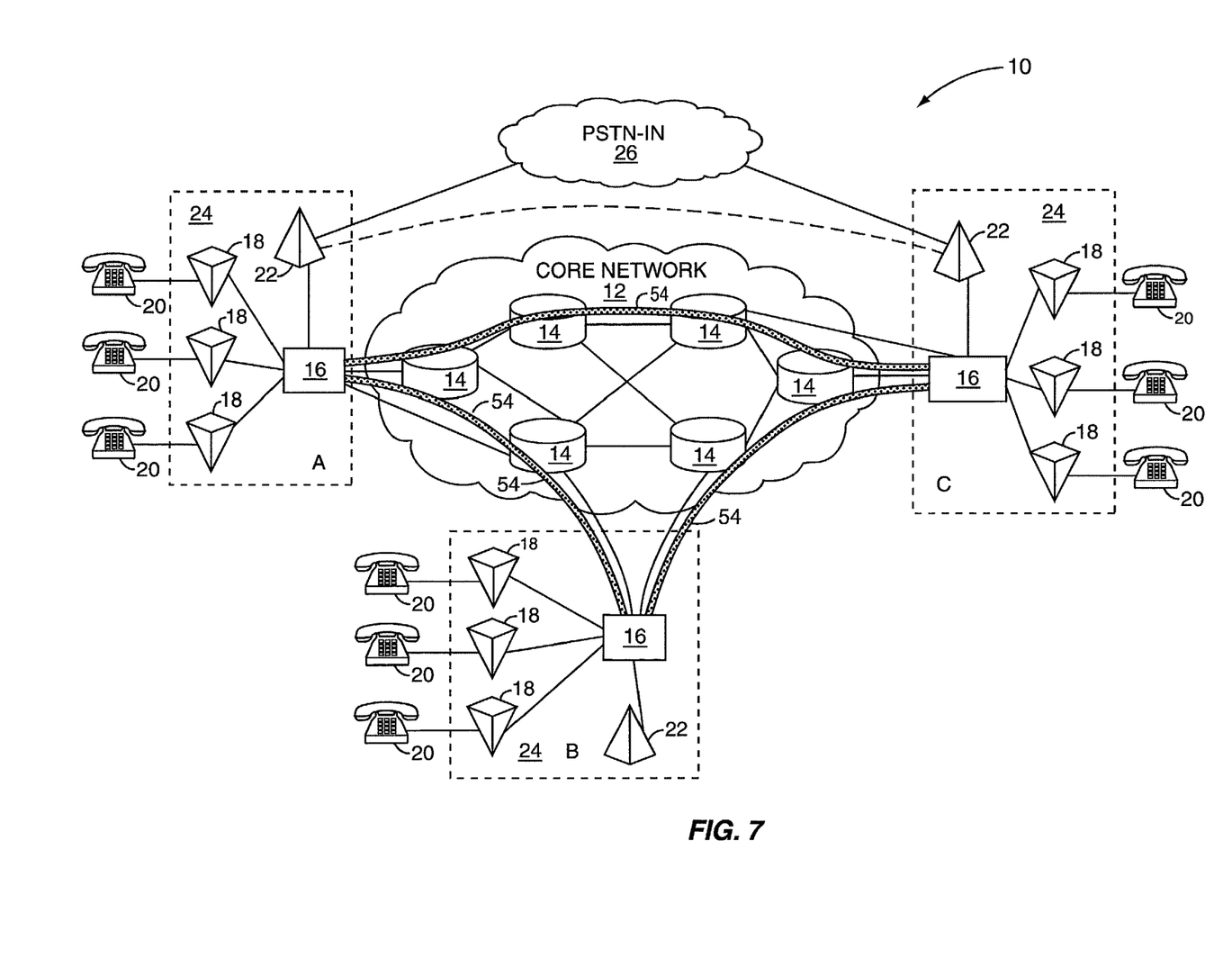
FIG. 7 illustrates a network mesh configuration according to one embodiment of the present invention.

By associating the virtual trunk group with an LSP 54, the present invention assures quality of service levels over a packet network. As illustrated in FIG. 7, LSPs 54 and corresponding virtual trunk groups can be configured between each of the various LERs provided by the edge routers 16, to provide a comprehensive mesh throughout the core network 12. To protect against link or device failures, backup LSPs 58, represented by dashed lines in FIG. 8, may be provided in case the primary LSPs 54 are unavailable. The backup LSPs 58 are also engineered and provisioned with the maximum bandwidth required for the full virtual trunk group. If a primary LSP 54 fails, the LER provided by the edge router 16 can automatically route the traffic to the backup LSP 58. The LSRs provided by the routers 14 in the core network 12 also have routing tables to facilitate the backup LSPs 58. As such, call processing provided by the media gateway controllers 22 and the individual media flows 56 between the gateways 18 and the edge routers 16 are unaffected and are not required to react to a failure, unless both the primary and backup LSPs 54, 58 fail for a given virtual trunk group.

Figure 8:
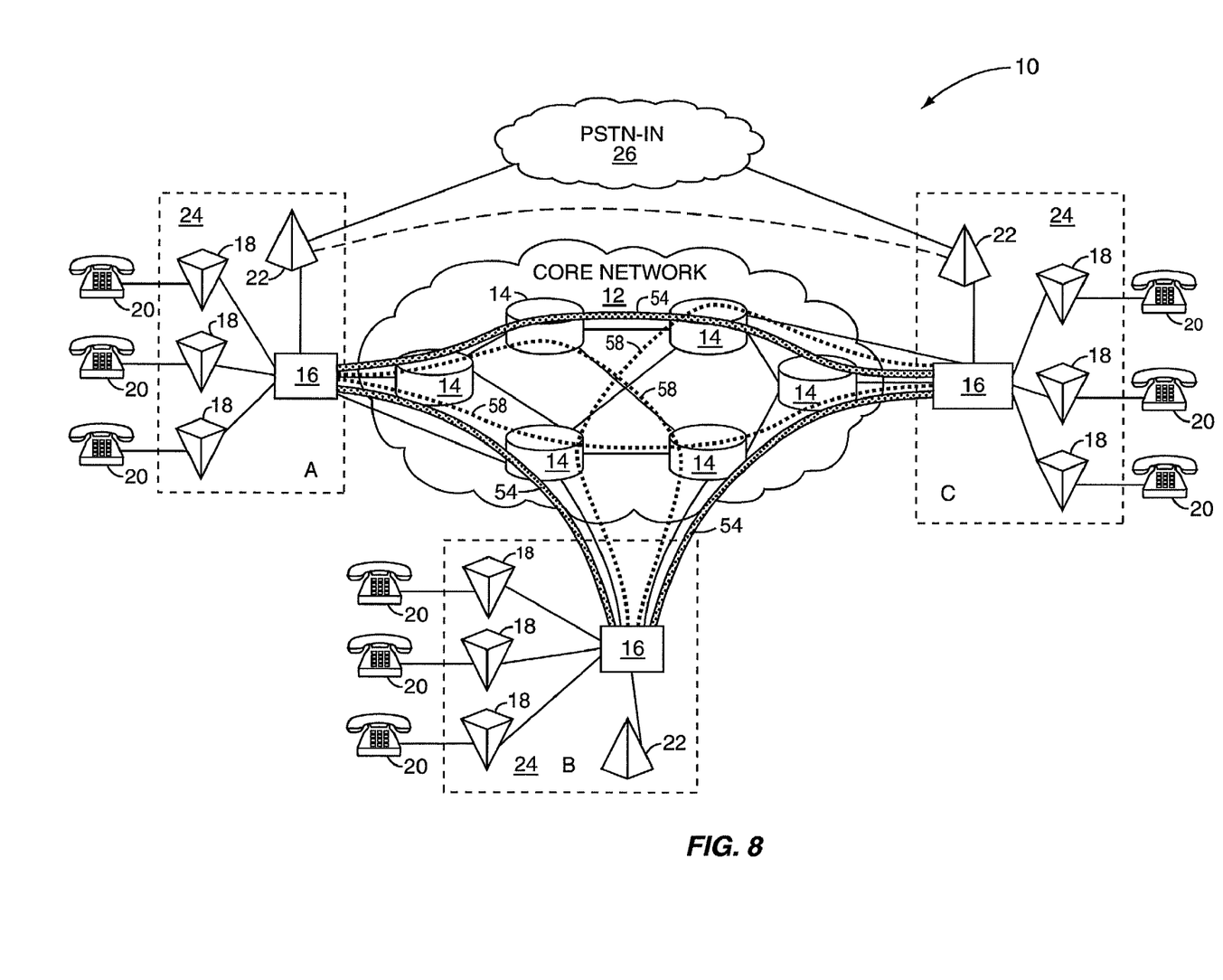
FIG. 8 illustrates backup label switched paths for the mesh illustrated in FIG. 7.

In another embodiment, instead of using a single LER, a pair of LERs may be used to increase network reliability, wherein a main LSP 54 terminates on one LER and a backup LSP 58 terminates on the second LER. Those skilled in the art will recognize the various combinations and flexibility provided with the implementation of a backup LSP 58 in association with a main LSP 54.

In one embodiment of the present invention, a failure of an LSP 54 or backup LSP 58 may be quickly detected by sending heartbeat signals, such as those described under ITU-T Recommendation Y.1711—OAM mechanism for MPLS networks, over the LSP 54 or backup LSP 58 at periodic intervals. For example, if three heartbeats in a row are not received by the receiving LER, it will trigger a switchover to the backup LSP 58. Again, the switchover is done independently of call processing. The heartbeat interval may be integrated as part of the heartbeat message itself.

When both the primary and backup LSPs 54, 58 are operational, the LERs provided by the edge routers 16 can take steps to provide load sharing between the primary and backup LSPs 54, 58, in effect doubling the available bandwidth. Load sharing helps in reducing transport delay and jitter under normal conditions, and thus, improves overall quality. Further, unused bandwidth may be used by lower-priority traffic. The LERs may also be configured to take steps to prioritize and control traffic based on a desired quality of service associated with the data being transferred. The primary and backup LSPs 54, 58 are in fact two unidirectional LSPs, one in each direction, providing bi-directional communication. In the preferred embodiment, each direction of the LSP 54, 58 will share the same links, routers 14, and nodes 24, instead of using potentially two different paths through the core network 12. Bi-directional primary and backup LSPs 54, 58 will reduce the impact of an LSP failure, as well as reduce the detection time of failures. If both the primary and backup LSPs 54, 58 fail, the LER provided by the edge router 16 may inform the media gateway controller 22 that the LSP, and thus the associated virtual trunk group, is no longer available. The media gateway controller 22 then takes the virtual trunk group out of service and block calls requiring use of the failed LSP 54, or takes alternative action.

In an alternative embodiment as shown in FIG. 9, the core network 12 may include ATM switches and the reserved bandwidth path is implemented via permanent virtual circuits (PVCs) that may be established between two edge ATM switches through the core network 12. Like the LSPs, the PVCs are engineered and provisioned with a guaranteed bandwidth, which corresponds to a virtual trunk group. PVCs will typically carry a set number of packet streams of voice over IP (VoIP), voice over ATM (VoATM), or the like. Call processing, backup reserve paths, and failure detection may take place as described above.

Typically, call processing takes place on a call-by-call basis, wherein channels associated with a call are allocated on a channel-by-channel basis. A call processing counter may be implemented to keep track of the number of channels being used or remaining available in light of the reserved bandwidth associated with the LSP 54 or virtual trunk group. If the call processing counter reaches a maximum, a fast busy signal may be provided to indicate that all circuits are busy, thereby preventing violation of bandwidth contracts or degradation in quality of service.

Thus, the present invention establishes reserved paths between edge routers 16 with which virtual trunk groups are associated. The bandwidth for the reserved path in the associated virtual trunk group coincides to ensure quality of service levels over the core network 12. The reserved paths may be formed using various architectures, including MPLS and PVCs 62. Those skilled in the art will recognize improvements and modifications to the preferred embodiments of the present invention. All such improvements and modifications are considered within the scope of the concepts disclosed herein and the claims that follow.

What is claimed is:

1. A method comprising:
    a) establishing a reserved path having a defined bandwidth between two edge routers, at least one of the two edge routers associated with a plurality of media gateways;
    b) defining a virtual trunk group having the defined bandwidth; and
    c) associating the virtual trunk group with the reserved path such that calls within the virtual trunk group are carried over the reserved path,
    wherein all calls supported by the virtual trunk group are carried over a shared path provided by the reserved path.

2. The method of claim 1 further comprising:
    d) providing individual media flows for each call between each edge router and the plurality of media gateways associated with the edge routers; and
    e) assigning the individual media flows to the virtual trunk group to facilitate communications between the plurality of media gateways and along the reserved path between the two edge routers.

3. The method of claim 1 wherein the reserved path is a label switched path provided by an MPLS network, and the edge routers are label edge routers.

4. The method of claim 1 wherein the reserved path is an ATM permanent virtual circuit.

5. The method of claim 1 further comprising establishing a reserved backup path having the defined bandwidth between the two edge routers.

6. The method of claim 5 further comprising:
    d) detecting a failure of the reserved path; and
    e) associating the virtual trunk group with the reserved backup path such that calls within the virtual trunk group are carried over the reserved backup path when the failure is detected.

7. The method of claim 6 further comprising:
    f) providing a heartbeat signal along the reserved path;
    g) monitoring the heartbeat signal;
    h) triggering the association of the virtual trunk group with the reserved backup path if the heartbeat signal is undetected.

8. The method of claim 5 further comprising distributing loads associated with calls supported by the virtual trunk group among the reserved path and the reserved backup path when the reserved path and the reserved backup path are operational.

9. The method of claim 1 further comprising:
    d) associating the plurality of media gateways with at least one of the two edge routers to form a node, the plurality of media gateways providing an interface for circuit-switched communications; and
    e) providing call processing for calls handled by the media gateways with a media gateway controller associated with the node.

10. A method comprising:
    a) establishing a reserved path having a defined bandwidth between two edge routers, at least one of the two edge routers associated with a plurality of media gateways;
    b) defining a virtual trunk group having the defined bandwidth; and
    c) associating the virtual trunk group with the reserved path such that calls within the virtual trunk group are carried over the reserved path,
    wherein the virtual trunk group is defined to support a set number of calls at any given time based on the defined bandwidth and further comprising limiting a number of calls for the virtual trunk group based on the set number of calls.

11. A method comprising:
    a) establishing a reserved path having a defined bandwidth between two edge routers, at least one of the two edge routers associated with a plurality of media gateways;
    b) defining a virtual trunk group having the defined bandwidth; and
    c) associating the virtual trunk group with the reserved path such that calls within the virtual trunk group are carried over the reserved path,
    comprising establishing a plurality of reserved paths between a plurality of pairs of edge routers and defining a virtual trunk group for each of the plurality of reserved paths to form a mesh of virtual trunk groups.

12. A node comprising:
    a) a first edge router providing one end of a reserved path having a defined bandwidth and extending to another edge router;
    b) a plurality of media gateways associated with the first edge router and supporting calls from telephony devices; and
    c) a media gateway controller facilitating call control for the plurality of media gateways wherein a virtual trunk group having the defined bandwidth is associated with the reserved path such that the calls within the virtual trunk group are carried over the reserved path via the first edge router,
    wherein the virtual trunk group is defined to support a set number of calls at any given time based on the defined bandwidth.

13. The node of claim 12 wherein individual media flows for each call are established between the edge router and the plurality of media gateways; and the individual media flows are assigned to the virtual trunk group to facilitate communications between the plurality of media gateways and along the reserved path between the two edge routers.

14. The node of claim 12 wherein the reserved path is an MPLS label switched path and the edge router is a label edge router.

15. The node of claim 12 wherein the reserved path is an ATM permanent virtual circuit.

16. The node of claim 12 wherein a reserved backup path is established having the defined bandwidth between the two edge routers.

17. The node of claim 16 wherein the edge router is adapted to:
    d) detect a failure of the reserved path; and
    e) associate the virtual trunk group with the reserved backup path such that calls within the virtual trunk group are carried over the reserved backup path when the failure is detected.

18. The node of claim 17 wherein the edge router is further adapted to:
f) provide a heartbeat signal along the reserved path;
g) monitor the heartbeat signal;
h) trigger the association of the virtual trunk group with the reserved backup path if the heartbeat signal is undetected.

19. The node of claim 16 wherein loads associated with calls supported by the virtual trunk group are distributed among the reserved path and the reserved backup path when the reserved path and the reserved backup path are operational.

20. A system comprising:
a) means for establishing a reserved path having a defined bandwidth between two edge routers, at least one of the two edge routers associated with a plurality of media gateways;
b) means for defining a virtual trunk group having the defined bandwidth; and
c) means for associating the virtual trunk group with the reserved path such that calls within the virtual trunk group are carried over the reserved path,
wherein all calls supported by the virtual trunk group are carried over a shared path provided by the reserved path.

21. The system of claim 20 further comprising:
d) means for providing individual media flows for each call between each edge router and the plurality of media gateways associated with the edge routers; and
e) means for assigning the individual media flows to the virtual trunk group to facilitate communications between the plurality of media gateways and along the reserved path between the two edge routers.

22. The system of claim 20 wherein the virtual trunk group is defined to support a set number of calls at any given time based on the defined bandwidth and further comprising means for limiting a number of calls for the virtual trunk group based on the set number of calls.

23. The system of claim 20 wherein the reserved path is an MPLS label switched path, and the edge routers are label edge routers.

24. The system of claim 20 wherein the reserved path is an ATM permanent virtual circuit.

25. The system of claim 20 further comprising means for establishing a plurality of reserved paths between a plurality of pairs of edge routers and defining a virtual trunk group for each of the plurality of reserved paths to form a mesh of virtual trunk groups.

26. The system of claim 20 further comprising means for establishing a reserved backup path having the defined bandwidth between the two edge routers.

27. The system of claim 26 further comprising:
d) means for detecting a failure of the reserved path; and
e) means for associating the virtual trunk group with the reserved backup path such that calls within the virtual trunk group are carried over the reserved backup path when the failure is detected.

28. The system of claim 27 further comprising:
f) means for providing a heartbeat signal along the reserved path;
g) means for monitoring the heartbeat signal;
h) means for triggering the association of the virtual trunk group with the reserved backup path if the heartbeat signal is undetected.

29. The system of claim 26 further comprising means for distributing loads associated with calls supported by the virtual trunk group among the reserved path and the reserved backup path when the reserved path and the reserved backup path are operational.

* * * * *